United States Patent [19]

Stoltman

[11] Patent Number: 4,513,775
[45] Date of Patent: Apr. 30, 1985

[54] PRESSURE REGULATOR

[75] Inventor: Donald D. Stoltman, Henrietta, N.Y.

[73] Assignee: General Motors Corporation, Detroit, Mich.

[21] Appl. No.: 469,725

[22] Filed: Feb. 25, 1983

[51] Int. Cl.³ .......................................... F16K 31/385
[52] U.S. Cl. .................................... 137/491; 137/492
[58] Field of Search ............ 137/491, 489, 492, 492.5, 137/505.18, 505.38

[56] References Cited

U.S. PATENT DOCUMENTS

| 474,244 | 5/1892 | Hanson | 137/491 |
| 1,091,536 | 3/1914 | Ross | 137/489 |
| 2,839,077 | 6/1958 | Kristensson | 137/491 |
| 2,946,344 | 7/1960 | Mott | 137/491 X |

FOREIGN PATENT DOCUMENTS 492672  2/1930  Fed. Rep. of Germany ...... 137/491

Primary Examiner—Alan Cohan
Attorney, Agent, or Firm—C. K. Veenstra

[57] ABSTRACT

A pressure regulator assembly, suitable for controlling the flow of compressed natural gas to fuel an internal combustion engine, has a small primary valve positioned by a regulator diaphragm to control the flow at high supply pressures and a large secondary valve to provide additional flow area at low supply pressures. Flow to the primary valve passes through a chamber having a restricted aperture from the inlet, and a control diaphragm responsive to the pressure in the chamber opens the secondary valve when the primary valve reaches its maximum flow capacity and the pressure in the chamber approaches the regulated pressure.

1 Claim, 2 Drawing Figures

PRESSURE REGULATOR

TECHNICAL FIELD

This invention provides an improved pressure regulator assembly suitable for controlling the flow of compressed natural gas in an engine fuel system.

BACKGROUND

When used as a fuel for an internal combustion engine, compressed natural gas is supplied to the fuel metering device at a selected pressure in the range between atmospheric pressure and about 50 psig (between 0 and about 340 kPa gauge). A pressure regulator is required to reduce the fuel pressure from the storage pressure of between 50 and 2500 psig (340 kPa and 17 MPa gauge) to the desired supply pressure.

In order to provide accurate control of the supply pressure when the storage pressure varies over a 50 to 1 range (2500 to 50 psig; 17 MPa to 345 kPa gauge), prior engine fuel systems have employed an array of pressure regulators arranged in series to reduce the fuel pressure in steps from the storage pressure to the supply pressure.

SUMMARY OF THE INVENTION

This invention provides a compact pressure regulator assembly employing a pair of interactive flow control valves which is suitable for establishing the desired supply pressure in a compressed natural gas fuel system.

In a pressure regulator assembly according to this invention, fluid such as compressed natural gas from a storage tank is directed through a restricted aperture into an operating pressure chamber and from the operating pressure chamber through an orifice into a regulated pressure region. A regulator diaphragm positions a small primary valve to control flow through the orifice so that the region is maintained at the desired regulated or supply pressure. The regulator diaphragm and primary valve are effective to maintain the desired pressure so long as the primary valve restricts flow through the orifice. When the primary valve permits maximum flow through the orifice, the pressure in the operating pressure chamber approaches the pressure in the regulated pressure region, and a control diaphragm opens a secondary valve so that flow past the secondary valve to the regulated pressure region supplements flow through the orifice to maintain the region at the desired pressure.

The details as well as other features and advantages of the preferred embodiment of this invention are set forth in the remainder of the specification and are shown in the accompanying drawing.

THE PREFERRED EMBODIMENT

Figure 1:
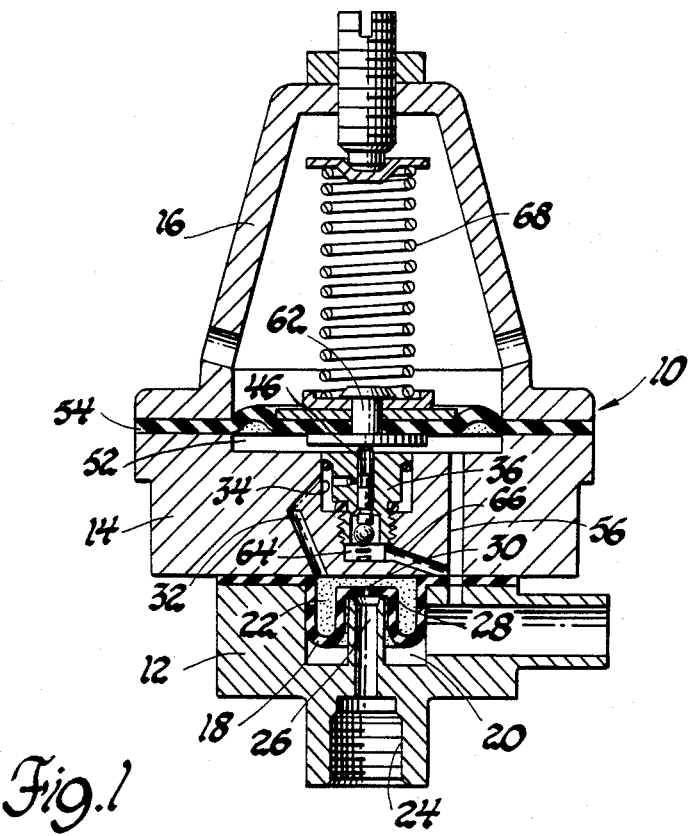
FIG. 1 is a sectional view of the preferred embodiment of a pressure regulator assembly employing this invention.

Referring to the drawing, a pressure regulator assembly 10 has a housing formed by a lower member 12, an intermediate member 14 and a cover 16. A control diaphragm 18 is sandwiched between housing members 12 and 14 to separate a regulated pressure region 20 below diaphragm 18 from an operating pressure chamber 22 above diaphragm 18. Lower housing member 12 has an inlet 24 with an opening 26 adapted to discharge directly to region 20, and the central portion 28 of diaphragm 18 forms a secondary valve controlling flow through opening 26 from inlet 24 to region 20.

Figure 2:
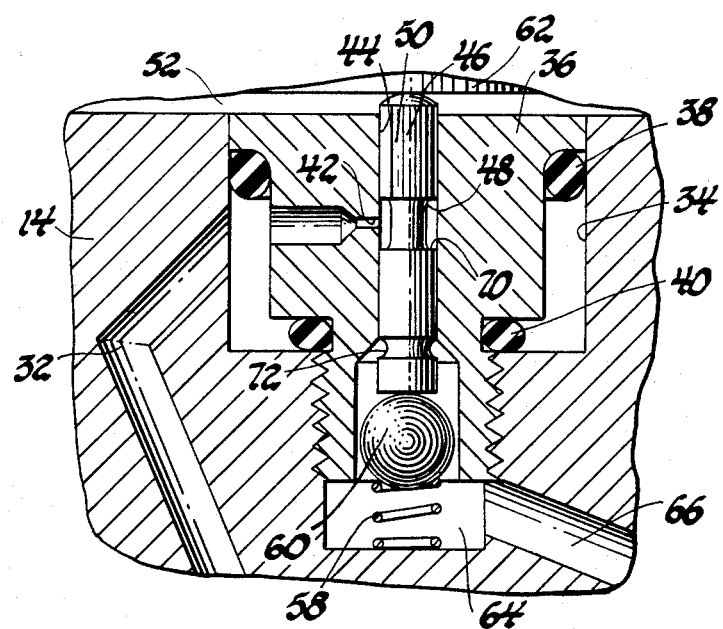
FIG. 2 is an enlarged view of a portion of FIG. 1 illustrating the primary valve included in the preferred embodiment.

The central portion 28 of diaphragm 18 has a restricted aperture 30 connecting inlet 24 to chamber 22, and intermediate housing member 14 has a passage 32 extending from chamber 22 to an upper recess 34. As shown in FIG. 2, an insert 36 is threaded into the lower portion of recess 34 and is sealed by O-rings 38 and 40 so that all flow from passage 32 into recess 34 is directed through an orifice 42 to the central bore 44 of insert 36. An axially slidable valve pin 46 has a lap fit in bore 44 and is provided with an annular recess 48 adjacent orifice 42 and an axial groove 50 extending from recess 48 to a chamber 52. As shown in FIG. 1, chamber 52 is defined by intermediate member 14 and a regulator diaphragm 54 which is sandwiched between intermediate member 14 and cover 16. Intermediate member 14 also has a passage 56 connecting chamber 52 and region 20 so that chamber 52 forms an extension of regulated pressure region 20.

As shown in FIG. 2, a light spring 58 presses against a ball 60 below valve pin 46 to urge valve pin 46 into engagement with a central head 62 carried by and forming a portion of regulator diaphragm 54. As shown in FIG. 1, the volume 64 in intermediate member 14 below valve pin 46 is connected through a passage 66 with passage 56 and thus with regulated pressure region 20.

A regulator spring 68 biases diaphragm 54 downwardly to establish the desired pressure in chamber 52 and thus in regulated pressure region 20. Diaphragm 54 accordingly lowers valve pin 46 so that orifice 42 is exposed above a shoulder 70 on valve pin 46, thereby allowing flow from inlet 24 through aperture 30, chamber 22, passage 32, recess 34, orifice 42, recess 48, groove 50, chamber 52 and passage 56 to region 20. As the pressure in region 20 and chamber 52 approaches the desired pressure established by spring 58, diaphragm 54 rises sufficiently to bring shoulder 70 on valve pin 46 adjacent orifice 42. Any further tendency for the pressure in region 20 and chamber 52 to increase causes shoulder 70 on valve pin 46 to restrict flow through orifice 42. Thus so long as orifice 42 provides sufficient capacity, valve pin 46 will control flow to maintain region 20 at the desired pressure.

Aperture 30 in diaphragm 18 has a smaller flow area than orifice 42. Thus when shoulder 70 on valve pin 46 permits maximum flow through orifice 42, the pressure in chamber 22 approaches the pressure in region 20, and the central secondary valve portion 28 of diaphragm 18 is lifted away from opening 26 to permit flow from inlet 24 directly to region 20. As region 20 approaches the desired pressure, diaphragm 54 again is lifted against the bias of spring 68 and spring 58 lifts valve pin 46 causing shoulder 70 to restrict flow through orifice 42. The flow through aperture 30 then increases the pressure in chamber 22 toward the pressure in inlet 24, and control diaphragm 18 then seats secondary valve 28 across opening 26 to obstruct flow from inlet 24 directly to region 20.

Valve assembly 10 is thus effective to maintain region 20 at the desired pressure established by spring 68.

It will be noted in FIG. 2 that valve pin 46 has a slight undercut 72 to minimize the tendency for valve pin 46 to stick in bore 44 should microscopic dirt find its way into this area of the valve assembly.

Orifice 42 may have a diameter as small as 0.010 inch (0.25 mm) and still provide sufficient capacity for all the flow required when the inlet pressure is high. When the inlet pressure is low, however, orifice 42 will not provide sufficient capacity if high flow rates are required, and flow through orifice 42 then must be supplemented by flow through opening 26.

The flow area available through opening 26 will be determined by the displacement of secondary valve 28 which varies with both the pressure in inlet 24 and the pressure in chamber 22 (the pressure in region 20 remaining constant during operation). As secondary valve 28 is lifted to permit flow through opening 26, the restored pressure in region 20 and chamber 52 lifts regulator diaphragm 54 and shoulder 70 on valve pin 46 again starts to restrict flow through orifice 42; the resulting increase in pressure in chamber 22 prevents uncontrolled lift of secondary valve 28. Thus primary valve pin 46 and secondary valve 28 interact to provide stable control of the pressure in region 20.

The embodiments of the invention in which an exclusive property or privilege is claimed are defined as follows:

1. A pressure regulator assembly comprising a housing having a regulated pressure region, an operating pressure chamber and an inlet, said assembly having an aperture for flow from said inlet to said chamber and an orifice for flow from said chamber to said region, a primary valve controlling flow through said orifice, a regulator diaphragm associated with said primary valve, said regulator diaphragm being responsive to the pressure in said region for positioning said primary valve so that flow through said orifice maintains said region at a desired pressure when said primary valve restricts flow through said orifice, said housing also having an opening for flow directly from said inlet to said region, a secondary valve controlling flow through said opening, and a control diaphragm associated with said secondary valve, said control diaphragm being responsive to the pressure in said chamber for positioning said secondary valve so that flow through said opening is obstructed when said primary valve restricts flow through said orifice and the pressure in said chamber approaches the pressure in said inlet, said control diaphragm being further responsive to the pressure in said chamber for positioning said secondary valve so that flow through said opening supplements flow through said orifice to maintain said region at the desired pressure when said primary valve permits maximum flow through said orifice and the pressure in said chamber approaches the pressure in said region, and wherein said primary valve is a slidable valve pin having a lap fit in a bore formed in said housing, said orifice opens into the side of said bore, said valve pin is provided with a shoulder defining an annular recess adjacent said orifice and an axial groove extending from said recess to said chamber, said shoulder forming the portion of said valve pin adapted to restrict flow through said orifice, a spring urges said valve pin into engagement with said regulator diaphragm, and a ball is interposed between said spring and said valve pin.

* * * * *